United States Patent
Yagita

(10) Patent No.: US 7,283,266 B2
(45) Date of Patent: Oct. 16, 2007

(54) INFORMATION PROCESSING APPARATUS AND PRINT CONTROL APPARATUS, DATA PROCESSING METHOD, STORAGE MEDIUM AND PROGRAM

(75) Inventor: Takashi Yagita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 10/023,873

(22) Filed: Dec. 21, 2001

(65) Prior Publication Data

US 2002/0085228 A1    Jul. 4, 2002

(30) Foreign Application Priority Data

| Dec. 28, 2000 | (JP) | ............................. 2000-401216 |
| Dec. 28, 2000 | (JP) | ............................. 2000-401217 |
| Dec. 20, 2001 | (JP) | ............................. 2001-387571 |

(51) Int. Cl.
 *G06F 15/00* (2006.01)
 *B41J 1/00* (2006.01)

(52) U.S. Cl. .................... 358/1.15; 358/1.13; 358/403; 358/434

(58) Field of Classification Search ............... 358/1.15, 358/1.9, 1.13, 1.16, 403, 404, 407, 434; 709/206, 709/207, 228, 229, 239, 242
See application file for complete search history.

(56) References Cited

U.S. PATENT DOCUMENTS

| 4,876,606 | A  | * | 10/1989 | Banno et al. ................ 358/434 |
| 6,192,407 | B1 | * | 2/2001  | Smith et al. ................. 709/229 |
| 6,519,048 | B1 | * | 2/2003  | Tanaka ....................... 358/1.13 |
| 6,725,300 | B1 | * | 4/2004  | Nagasaka et al. ............. 710/62 |
| 6,785,727 | B1 | * | 8/2004  | Yamazaki .................... 709/229 |
| 6,978,299 | B1 | * | 12/2005 | Lodwick ..................... 709/223 |
| 2002/0001495 | A1 | * | 1/2002 | Mochizuki ................... 400/61 |

FOREIGN PATENT DOCUMENTS

| JP | 10-100514  | 4/1998 |
| JP | 11-024870  | 1/1999 |
| JP | 2000-029642 | 1/2000 |
| JP | 2000-132434 | 5/2000 |

* cited by examiner

*Primary Examiner*—Thomas D. Lee
(74) *Attorney, Agent, or Firm*—Fitzpatrick, Cella, Harper & Scinto

(57) ABSTRACT

An information processing apparatus and a pull print printing system are provided, which, according to a print instruction (print request, from a user, hold print data to be an object of printing, generate reference information for performing pull print corresponding to the held print data and utilize the generated reference information as reference information for requesting printing in order to causing an IPP printing apparatus to perform printing.

30 Claims, 14 Drawing Sheets

| PRINT MANAGEMENT DATA | |
|---|---|
| PRINT DATA-1 | URL1 |
| PRINT DATA-2 | URL2 |
| PRINT DATA-3 | URL3 |
| | |
| | |
| | |

INFORMATION PROCESSING APPARATUS AND PRINT CONTROL APPARATUS, DATA PROCESSING METHOD, STORAGE MEDIUM AND PROGRAM

BACKGROUND OF THE INVENTION

1. Field of the Invention

The present invention relates to an information processing apparatus and a pull print printing system that are capable of executing a print instruction at least with respect to an IPP print apparatus via a predetermined communication medium, an information processing method, a storage medium and a program.

2. Related Background Art

Currently, a network printing system in which a plurality of client machines exist is realized.

In addition, in recent years, a printer has begun to be introduced into a market that is equipped with the Internet Printing Protocol (IPP) provided for by RFC as a protocol for Internet printing of a printer.

With this IPP, a function of "Print-URI request" is provided for. In addition, also provided for is a function with which a client issues a "Print-URI request" designating a URL to a printer, whereby the printer itself obtains and prints data on a Web server in a URL-designated destination (which is referred to as Pull Print). An IPP printer has realized to print Web pages in all over the world by this function. Further, a Printo-URI request that is designated by a URL through an access to a Web or the like may be referred to as a Printo-URL request.

However, under a conventional network print environment, even if an IPP printer exists under a network environment, its function cannot be utilized under a local network environment such as an office, which makes it inconvenient to use the printer.

In addition, if reference information or the like for specifying a storage place of print data such as a URL is not obtained or if reference information corresponding to desired print data is unknown, the IPP printer cannot be utilized.

The present invention aims to improve convenience of use of the IPP printer.

SUMMARY OF THE INVENTION

The present invention has been devised in view of these problems. An information processing apparatus in an embodiment of the present invention is an information processing apparatus that is characterized by comprising holding means for holding print data for which a print request is made in order to easily make an IPP printer available under a conventional local area network environment such as an office; generating means for generating reference information for performing pull print corresponding to the print data held in the holding means; and issuing means for issuing the reference information for performing pull print corresponding to the print data generated in the generating means to a printing apparatus, which is made communicatable via a predetermined communication medium, as a print request.

Alternatively, the information processing apparatus is characterized by further comprising a printing apparatus having a pull print function; generating means for generating reference information for performing pull print corresponding to print data for which a print request is made by the printing apparatus; and instructing means for instructing a printing apparatus, which is made communicatable via a predetermined communication medium, to print the reference information for performing the pull print generated in the generating means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

First Embodiment

Figure 1:
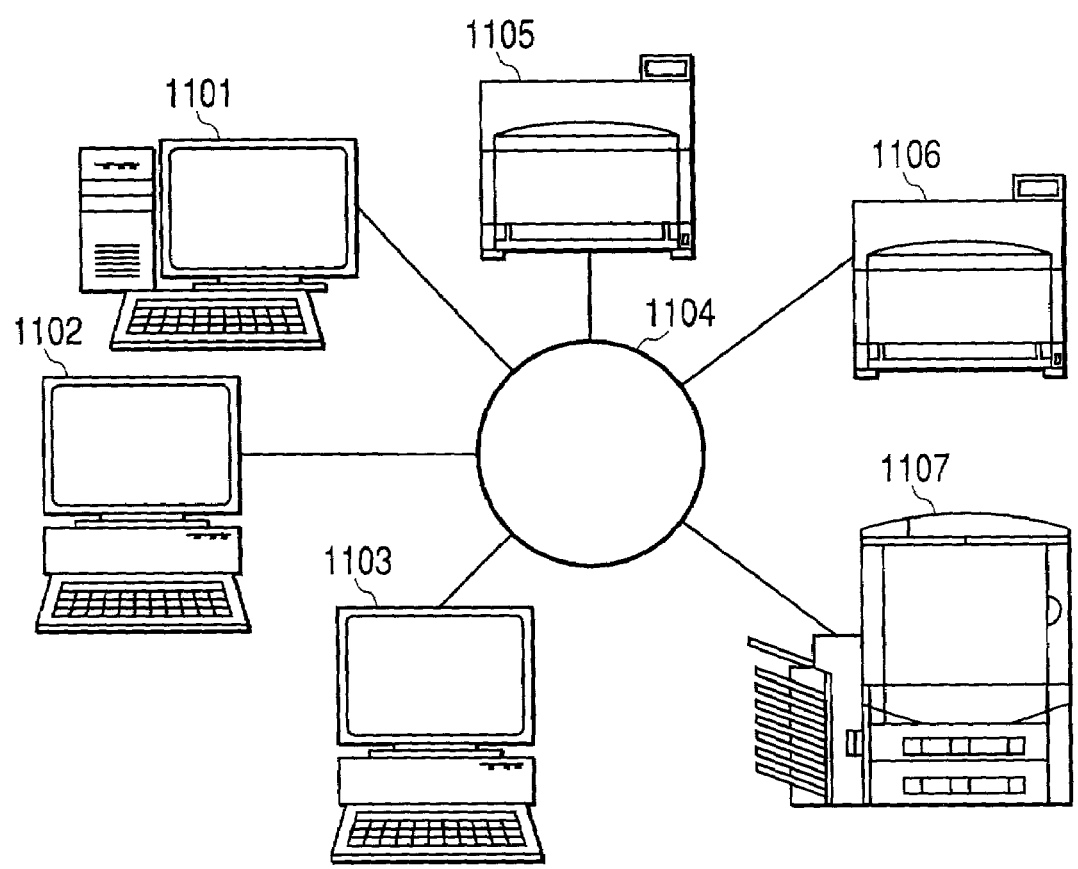
FIG. 1 is a view illustrating a configuration of a data processing system, to which an information processing apparatus is applicable, showing an embodiment of the present invention.

FIG. 1 is a view illustrating a configuration of a data processing system, to which an information processing apparatus is applicable, showing an embodiment of the present invention.

In the figure, reference numerals 1101 to 1103 denote client computers (PCs) that functionally operate as Web servers and 1104 denotes a network for connecting the devices, the above-described PCs 1101, 1102 and 1103. Reference numerals 1105, 1106 and 1107 denote printers that are connected to the above-described network 1104 and are communicatable with the PCs 1101 to 1103 by a predetermined protocol (IPP).

Figure 2:
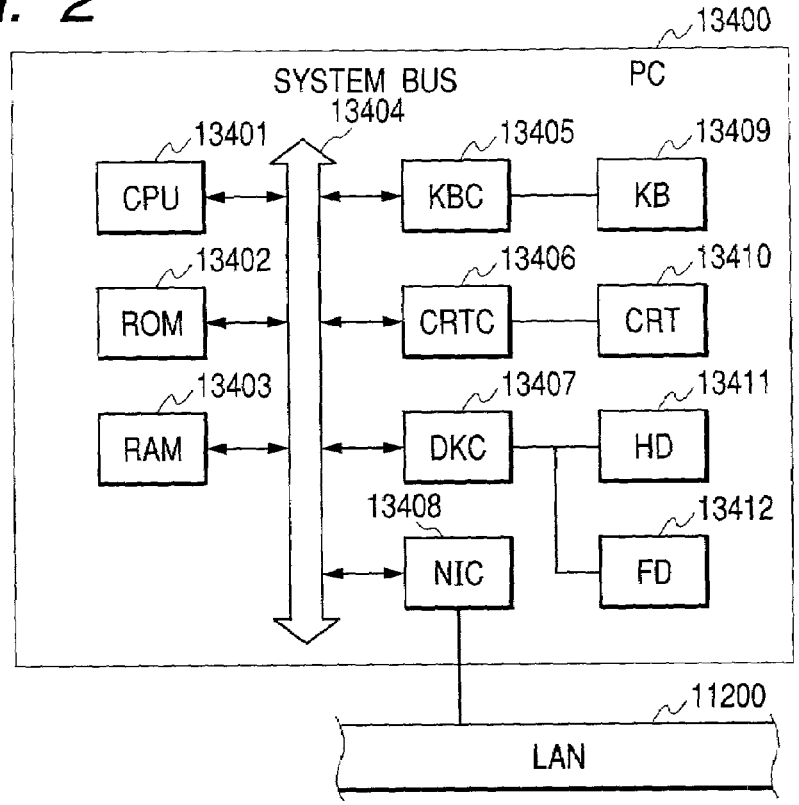
FIG. 2 is a block diagram illustrating a control configuration of a printer shown in FIG. 1.

FIG. 2 is a block diagram illustrating a control configuration of the PCs 1101 to 1103 shown in FIG. 1 and corresponds to a configuration of a PC that is operable by a predetermined protocol (e.g., IPP protocol). Further, the parts identical with those in FIG. 1 are denoted by the identical reference numerals.

In FIG. 2, reference numeral 13400 denotes a PC on which network device control software operates, which corresponds to the PCs 1101 to 1103 shown in FIG. 1.

The PC 13400 is provided with a CPU 13401 for executing a network device control program, which is stored in an ROM 13402 or a hard disk (HD) 13411 or supplied from a floppy disk drive (FD) 13412, and collectively controls each device connected to a system bus 13404. Reference numeral 13403 denotes an RAM, which functions as a main memory, a work area or the like of the CPU 13401. Reference numeral 13405 denotes a keyboard controller (KBC), which controls an input of an instruction from a keyboard (KB) 13409, a not-shown pointing device or the like.

Reference numeral 13406 denotes a CRT controller (CRTC), which controls a display of a CRT display (CRT) 13410. Reference numeral 13407 denotes a disk controller (DKC), which controls an access between the hard disk (HD) 13411 storing a boot program, various applications, an edit file, a user file, a network device control program and the like and the floppy disk controller (FD) 13412.

Reference numeral 13408 denotes a network interface card (NIC), which bi-directionally exchanges data with an agent or a network apparatus via an LAN 11200.

Figure 3:
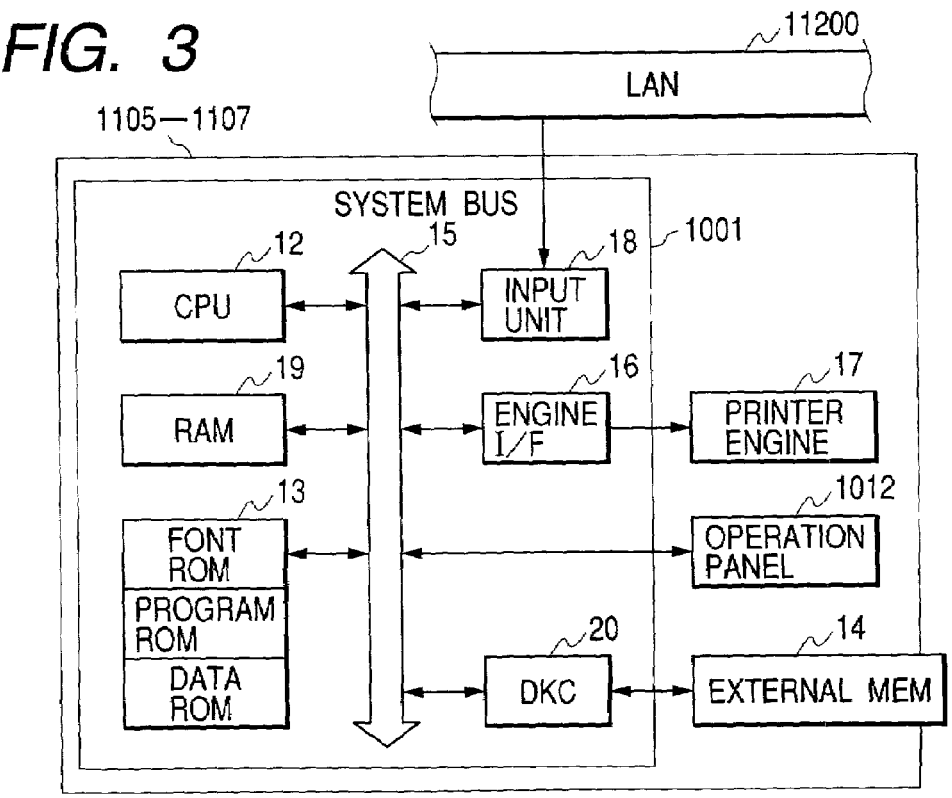
FIG. 3 is a block diagram illustrating a control configuration of the printer shown in FIG. 1.

FIG. 3 is a block diagram illustrating a control configuration of the printers 1105, 1106 and 1107 shown in FIG. 1, in which the parts identical with those in FIG. 1 are denoted by the identical reference numerals.

In a controller unit 1001 of the printers 1105, 1106 and 1107, reference numeral 12 denotes a printer CPU (CPU). The printer CPU collectively controls accesses with various devices connected to a system bus 15 according to a control program or the like stored in a program ROM of an ROM 13 or a control program or the like stored in an external memory 14 and outputs an image signal as output information to a printer engine 17 connected via an engine interface 16.

In addition, a control program or the like executable by the CPU 12 is stored in a program ROM of this ROM 13. Further, font data (including outline font data) or the like, which is used in generating the above-described output information, is stored in a font ROM of the ROM 13. Moreover, information or the like, which is utilized on a host computer 3000 in case of a printer without an external memory 14 such as a hard disk, is stored in a data ROM of the ROM 13.

The CPU 12 is capable of performing communication processing with the client computers 1101 to 1103 via an input unit 18 and is configured such that information or the like in the printers 1105, 1106 and 1107 can be notified to the client computers 1101 to 1103. In addition, the input unit 18 is provided with a network interface function with a communication function via the Internet or the like. Moreover, the CPU 12 is provided with a protocol analyzing unit or the like for analyzing a protocol of a print job received from the outside. The CPU 12 can be configured such that an optimal protocol is selected by the analysis of this protocol analyzing unit, thereby switchably controlling print data processing according to this embodiment and print data processing such as an ordinary TCP/IP or the like.

Reference numeral 19 denotes an RAM, which functions mainly as a main memory, a work area or the like of the CPU 12 and is configured such that a memory capacity can be expanded by an optional RAM to be connected to a not-shown extension port.

Further, the RAM 19 is used for an output information developing area, an environmental data storing area, an NVRAM or the like. Accesses of the above-described hard disk (HD) and the external memory 14 such as an IC card are controlled by a disk controller (DKC) 20. The external memory 14 is connected as an option and stores font data (including font data to be downloaded from the host computer 3000 or the like), an emulation program (including an emulation program to be downloaded from the client computers 1101 to 1103 or the like), form data (to be downloaded from the client computers 1101 to 1103) and the like.

In addition, reference numeral 1012 denotes the above-described operation panel, in which a switch for operation, an LED indicator and the like are arranged.

In addition, the printers 1105, 1106 and 1107 may be configured such that the above-described external memory is not limited to one but may be provided at least one or more and a plurality of external memories, which store a program for interpreting printer control languages with different option font cards and language systems in addition to an built-in font, can be connected to it. Moreover, the printers may have a not-shown NVRM, in which printer mode setting information from the operation panel 1012 is stored for each user and each group.

In addition, as a printing apparatus applicable to this embodiment, there are a laser beam printer employing an electrophotographic method, an ink jet printer employing an ink jet method, a thermal printer employing a thermal transfer method and the like.

Figure 4:
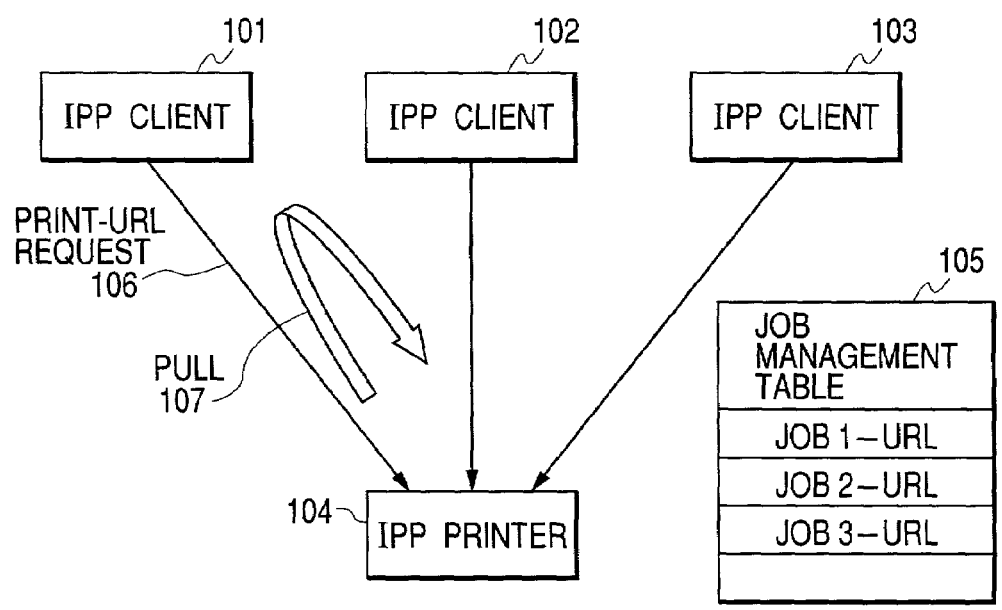
FIG. 4 is a block diagram illustrating a configuration of a print processing system, to which a data processing apparatus and a printing apparatus are applicable, showing the embodiment of the present invention.

FIG. 4 is a block diagram illustrating a configuration of a print processing system, to which data processing apparatus and a printing apparatus are applicable, showing an embodiment of the present invention. The print processing system corresponds to a print processing system with which a plurality of IPP clients (print clients) can issue "Print-URI (Uniform Resource Identification) requests", which designate a URL as identification information of a job to be printed, to an IPP printer. Further, when the plurality of IPP clients (print clients) issue "Print-URI requests", which designate a URL of a job to be printed, to the IPP printer, the printer registers the URL of the job in a job management table. When entering a print data acceptable state, the IPP printer obtains and prints print data of a URL-designated destination on the job management table 105 one after another by a Pull method. Here, the Pull method will be described in detail later.

Further, the above example has been described with reference to a URI. However, identification information for indicating a location where information to be printed (print data) exists is applicable. For example, a path for specifying a file using a position of a hierarchical structure, a serial number for identifying print data and the like are applicable.

In FIG. 4, reference numerals 101, 102 and 103 denote IPP clients (print clients as information processing apparatuses for requesting printing to an IPP printer), 104 denotes an IPP printer. The IPP clients 101, 102 and 103 and the IPP printer 104 are connected via a network (LAN) that is a predetermined communication medium. Further, it is assumed that an LAN includes a wireless LAN.

Reference numeral 105 denotes a job management table that is a management table for managing identification information (job name) of print data (print job) for which a print request is made and a storage place in which the print data is stored by associating them with each other. More specifically, a "Print-URI request" to be received by the IPP printer 104 is scheduled. Reference numeral 106 denotes a "print-URL request" that is sent by the IPP clients 101 to 103 at the time of printing.

Reference numeral 107 denotes a Pull method for obtaining print data from a URL-designated destination designated by a "Print-URI request" if the IPP printer 104 becomes capable of receiving print data. In addition, the Pull method 107 can use a protocol that can obtain data on the Internet such as a get method of an http protocol and a get command of an FTP protocol.

Figures 5A, 5B:
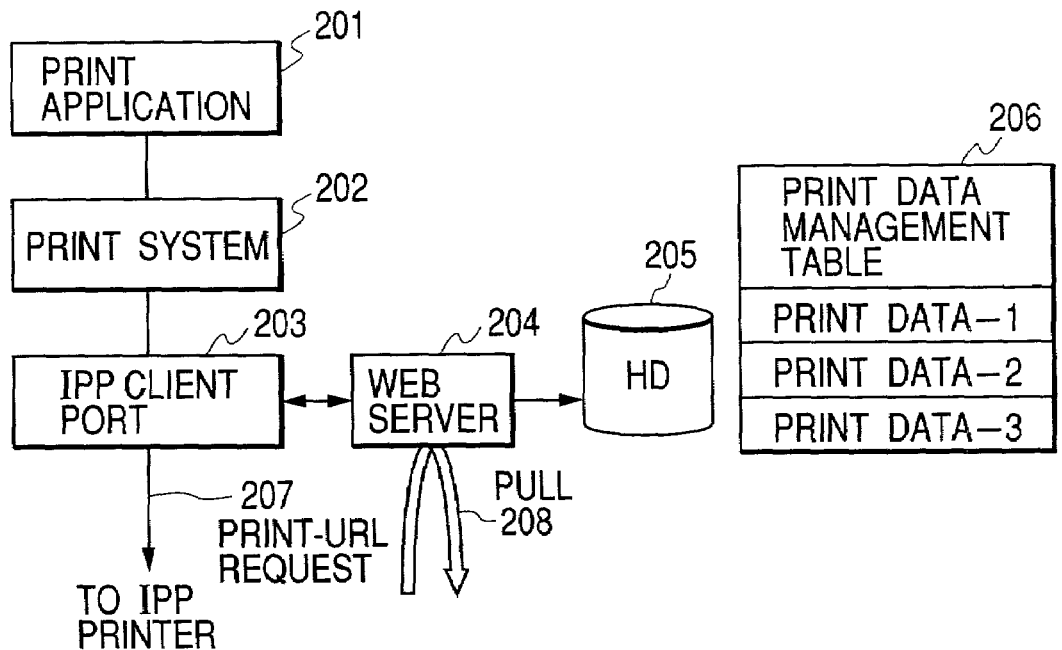
FIGS. 5A and 5B show block diagrams illustrating a Web server function processing configuration in the data processing apparatus shown in FIG. 4.

FIGS. 5A and 5B are block diagrams illustrating a configuration for processing a Web server function in the data processing apparatus shown in FIG. 4 and is an example of a module configuration of an IPP client (print client) for performing print using a "Print-URI request".

In FIG. 5A, reference numeral 201 denotes a print application and 202 denotes a printing system (in general, including a spooler, a print driver provided with a function for converting data into a command system that can be interpreted by a printer) that is usually included in an OS or the like.

Reference numeral 203 denotes an IPP client port, which receives print data, which can be processed by a printer, discharged (generated) by a printing system, registers the print data in a Web server 204 and issues a "Print-URI request" to the printer.

Reference numeral 204 denotes a Web server, which receives print data from the IPP client port 203 and stores and saves the print data in a storage device 205 such as a hard disk, records information in a print data management and returns the print data if a printer requests the print data by the Pull method (http protocol, FTP or the like).

Reference numeral 205 denotes a storage device (volatile storage device is also applicable) such as a hard disk, which saves print data passed from the Web server 204 according to a print data management table 206 of print data managed by the Web server 204. In addition, a detailed situation of management of the print data management table 206 is shown in FIG. 5B.

Reference numeral 207 denotes a Print-URI request, with which the IPP client port 203 requests the IPP printer to perform printing. Reference numeral 208 denotes a Pull method with which an IPP printer obtains print data and includes a get method of an http protocol, a get command of an ftp protocol or the like.

FIG. 5B shows details of the print management table 206 of FIG. 4, in which an IP address or the like of a printer, to which a Print-URI request should be issued, that is used when the IPP client port 203 issues the Print-URI request to a plurality of IPP printers is described. In addition, management tables as shown by 206 are managed by associating them with identification information (an IP address, an MAC address, a printer name and the like) of an IPP printer, respectively. The identification information of the IPP printer is preset management information or corresponds to extracted one of identification information of the IPP printer included in a get method or an ftp protocol.

Here, print management data shown in FIG. 5B will be described more in detail. Information written in the left column is job identification information 210 for identifying print data. A job name or the like of print data corresponding to a print instruction from a user corresponds to this. It is anticipated that the IPP client port 203 that has received a print instruction from the printing system 202, a serial number generated by the Web server 204 in association with a print job name, and the like are also applicable.

In addition, information in the right column 211 indicates a URL (reference information) associated with the above-described job identification information 210. Identification information that is utilized for specifying a file storing place (print data storing place) equivalent to a URL is applicable. In addition, this reference information 211 is equivalent to reference information that is generated in association with received print data when the Web server 204 receives registration of the print data from the IPP client port according to step S403 of FIG. 8 to be described later.

Figure 6:
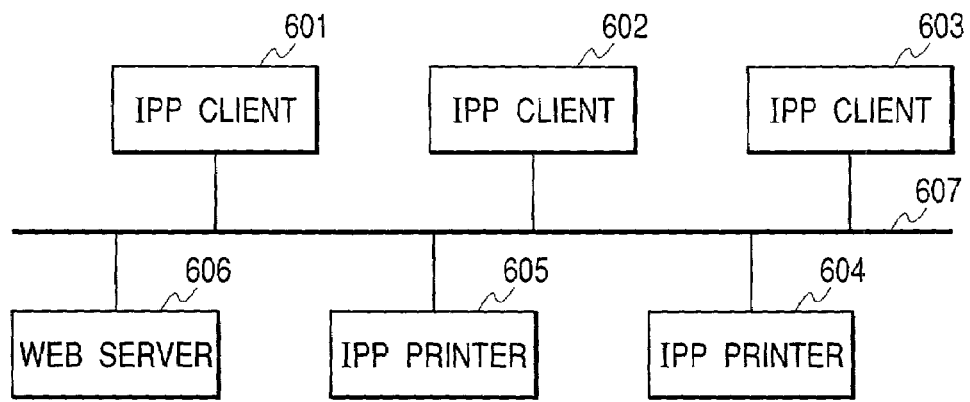
FIG. 6 illustrates an example of a system form to which the present invention is applicable.

FIG. 6 shows a block diagram of the case in which the module configuration shown in FIGS. 5A and 5B is applied to another system form. If each function of FIGS. 5A and 5B is applied to a system configuration shown in FIG. 6, the module functions of 201 to 203 in FIG. 5A are provided in IPP clients 601 to 603, respectively, and each module function of 204, 205, 206 and 208 is provided in a Web server 606. As a flow of information, for example, a print request is sent to the Web server 606 together with print data from the IPP client 601, reference information associated with the received print data is automatically generated in the Web server 606 and the generated reference information is inputted in an IPP printer 605 or the like as a print request. Upon receiving the reference information, the IPP printer obtains print data from the Web server 606 and executes image forming processing according to the reference information.

Figure 7:
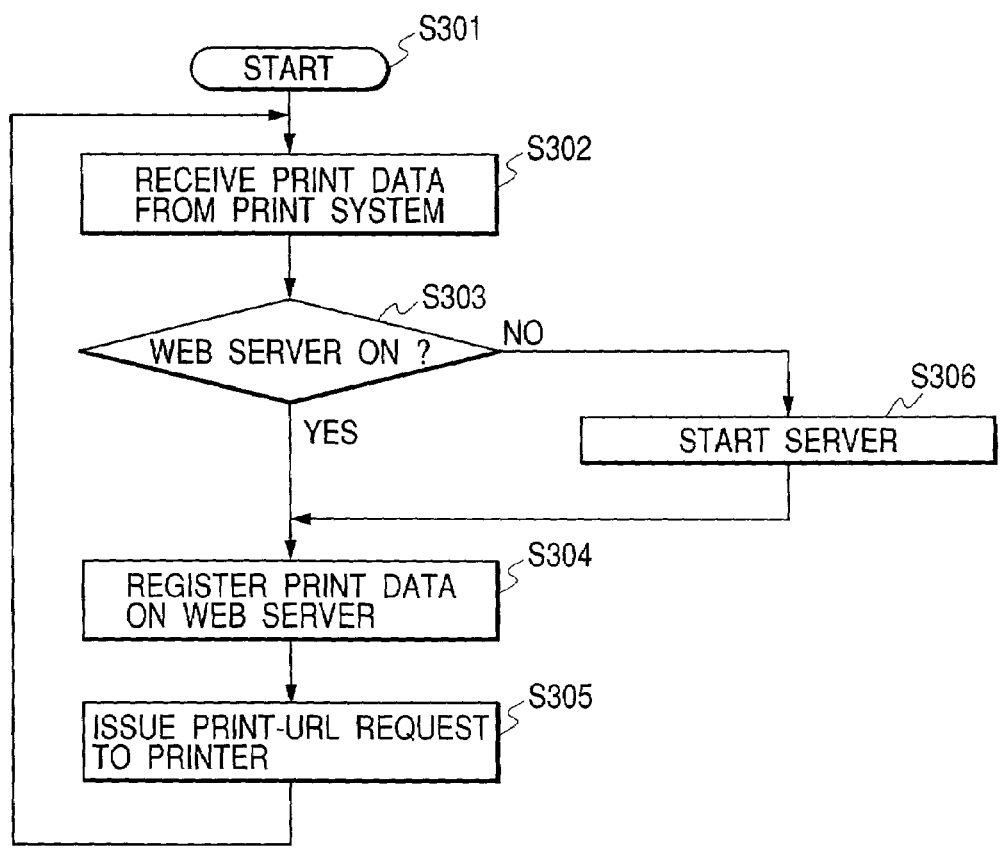
FIG. 7 is a flow chart showing an example of a data processing procedure by an IPP client port in accordance with the present invention.

FIG. 7 is a flow chart showing an example of a data processing procedure in the information processing apparatus in accordance with the present invention, which corresponds to an operation procedure of the IPP client port 203 in the case in which a user uses the print application 201 or the like in the IPP client 101 shown in FIG. 4 to perform printing. Further, reference numerals (301) to (306) denote respective steps. In addition, it is assumed that actual processing of each step is realized in response to a CPU provided in the information processing apparatus reading a program code for executing the flow chart of FIG. 7 stored in nonvolatile storage means such as an ROM, an HD or the like and executing processing according to the read program code.

First, when a client machine is started in step (301), the IPP client port 203 is started. When a user instructs printing using the print application 201 or the like, the instruction is converted into print data that a printer can process with a printer driver in the printing system 202 and the print data is passed to the IPP client port 203.

Then, when the IPP client port 203 receives print data from the printing system 202 in step (302), the IPP client port 203 checks whether or not the Web server 204 is started on the client in step (303). If the Web server 204 is not started, the IPP client port 203 starts the Web server 204 in step (306) and shifts to processing of step (304). Further, a Web server may be started in response to the start of the IPP client port 203.

On the other hand, if it is determined in step (303) that the Web server 204 is started, the IPP client port 203 shifts to the processing of step (304) and registers the print data received in step (302) in the Web server 204. Here, registering indicates processing for causing a Web server to store print data.

Next, the IPP client port 203 issues a "Print-URI request" designating a URL of the print data registered in the Web server 204 in step (304) to the IPP printer 104 in step (305) and returns to step (302) to continue the processing of step (302) and subsequent steps if print data is further passed from the printing system 202.

In this case, the printer management table 206, which is registered in association with the IPP printer 104 to which a "Print-URI request" should be issued, is referenced.

Further, the above-described IPP client port 203 ends processing in such a case in which a client system is shut down.

Figure 11:
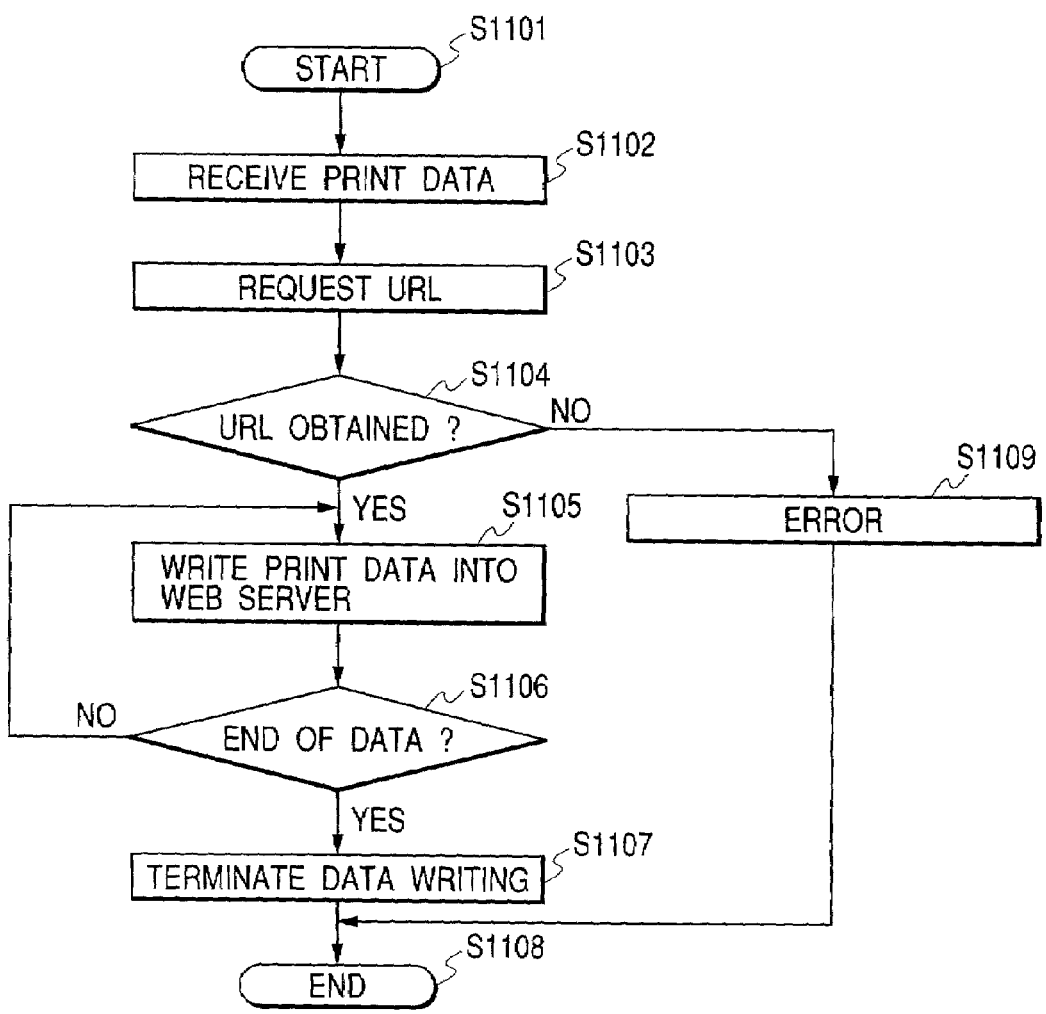
FIG. 11 is a flow chart showing an example of a detailed data processing procedure corresponding to step (304) of FIG. 7.

FIG. 11 shows an operation procedure of the IPP client port 203 in the case in which a user performs printing using the print application 201 or the like in the IPP client 101 shown in FIG. 4 and corresponds to details of step (304) of FIG. 7. Further, reference numerals (1101) to (1108) denote respective steps.

First, upon receiving data from the printing system 202 in step (1101), the IPP client port 203 starts receiving print data in step (1102) and issues a request for obtaining a URL corresponding to the print data to a Web server in step (1103).

Then, the IPP client port 203 determines in step (1104) if the URL corresponding to the print data was successfully obtained from the Web server. If it was successfully obtained, the IPP client port 203 writes the print data received from the printing system 202 in the Web server in step (1105). Further, this writing processing is equivalent to the above-described registration processing of print data to a Web server.

On the other hand, if the URL corresponding to the print data has not been successfully obtained from the Web server in step (1104), the IPP client port 203 rejects receiving processing of data against the printing system 202 in step (1109) and shifts to step (1108) to end the processing regarding that an error has occurred. This is equivalent to processing for checking if generation processing of a URL has been normally executed.

Next, the IPP client port 203 determines in step (1106) if writing of print data received from the printing system 202 has ended, and if it has not ended, shifts the processing to step (1104) to continue writing processing in the Web server.

On the other hand, if it is determined in step (1106) that the writing of the print data received from the printing system 202 in the Web server has ended, the IPP client port 203 performs processing for ending writing in the Web server in step (1107) and shifts to step (1108) to end the registration processing of print data in the Web server.

Figure 8:
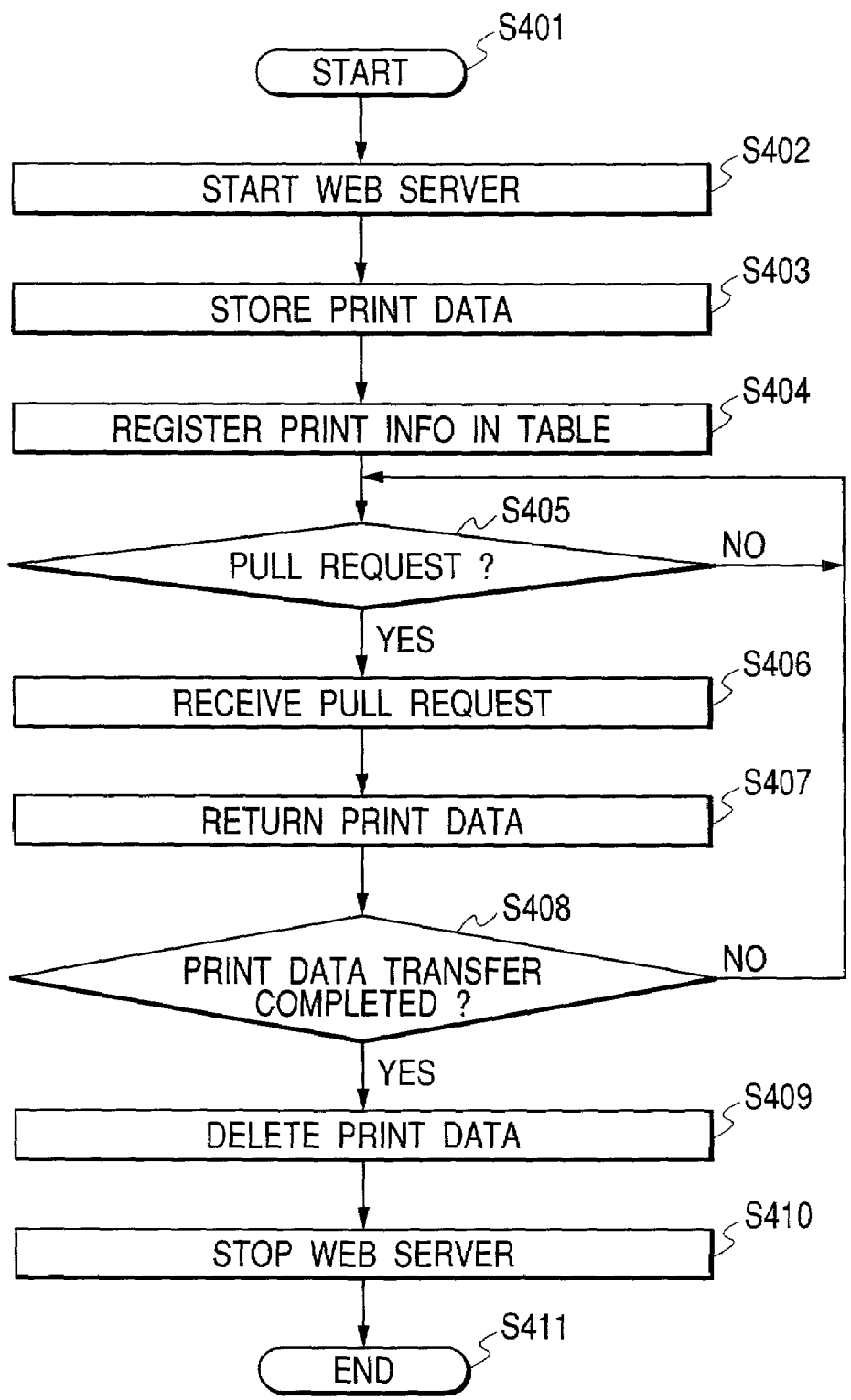
FIG. 8 is a flow chart showing an example of a data processing procedure by a Web server in accordance with the present invention.

FIG. 8 is a flow chart showing an example of a data processing procedure in the information processing apparatus in accordance with the present invention and corresponds to a processing procedure that should be executed by the Web server 204 shown in FIGS. 5A or 6. Further, reference numerals (401) to (411) denote respective steps. In addition, it is assumed that actual processing of each step is realized in response to a CPU provided in the information processing apparatus reading a program code for executing the flow chart of FIG. 8 stored in nonvolatile storage means such as an ROM and an HD and executing processing according to the read program code.

First, if the Web server 204 is not started in step (401), the Web server 204 is started by the IPP client port 203 in step (402). Alternatively, the Web server may be started in the case in which a client system is started, or the like.

Next, when print data is registered by the IPP client port 203 in step (403), storage (saving) of the print data in the storage device 205 or the like is executed.

Figure 12:
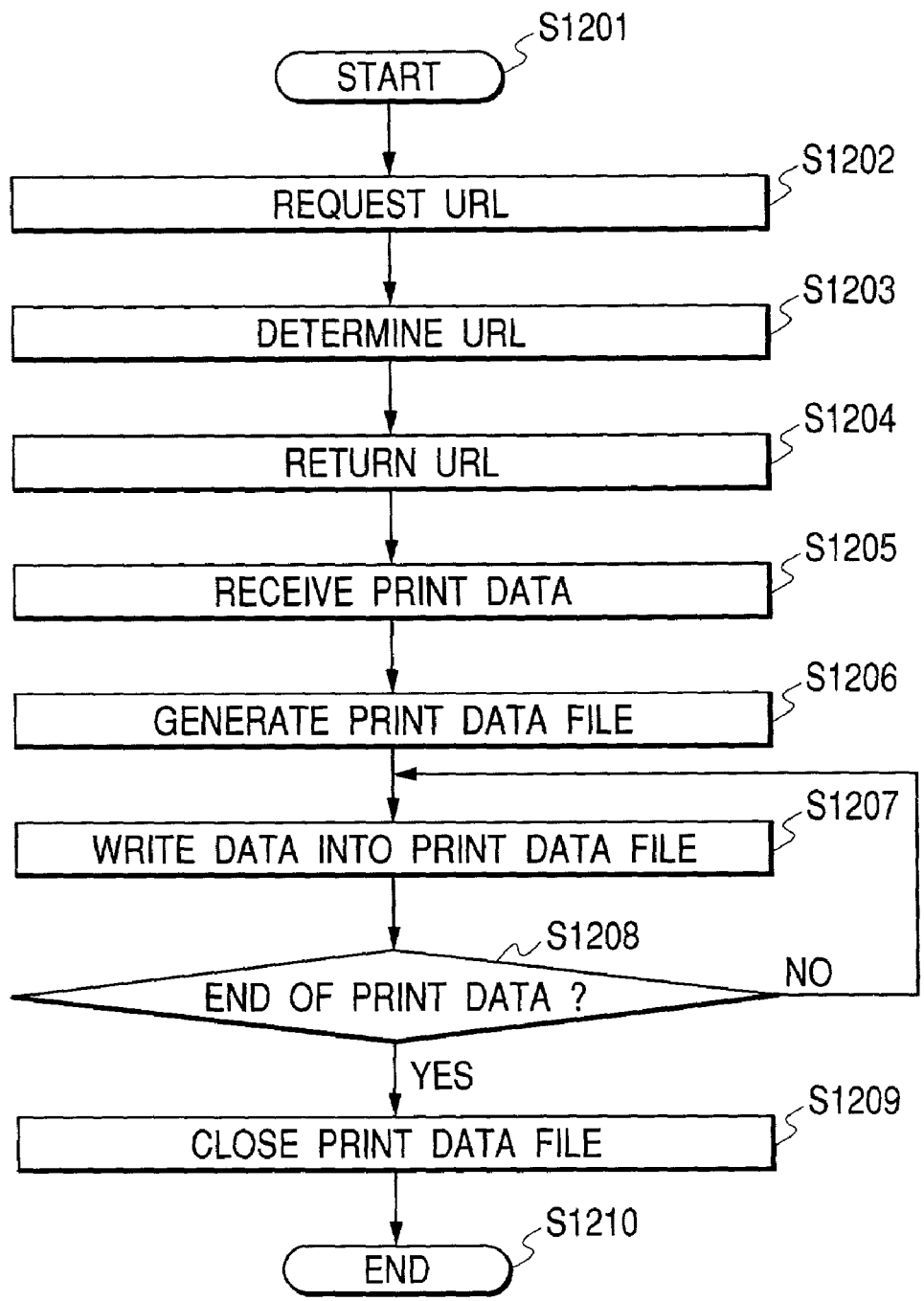
FIG. 12 is a flow chart showing an example of a detailed data processing procedure by a Web server 204 corresponding to step (403) of FIG. 8.

FIG. 12 is a flow chart showing an example of a processing procedure in the information processing apparatus in accordance with the present invention, which corresponds to step (403) of FIG. 8 that is executed by the Web server 204 shown in FIG. 5A. Further, reference numerals (1201) to (1210) denote respective steps.

First, when a URL obtaining request is issued to the Web server 204 by the IPP client port 203 in step (1201), URL obtaining request processing is started in step (1202), a URL is determined such that it does not overlap a URL of print data in step (1203) and information of the determined URL is generated. In addition, when the URL is generated, a management table as described above in FIG. 5B is updated and generated. The URL in this context is not limited to a URL but reference information for performing pull print is applicable. For example, identification information such as a serial number can be applied.

Next, the URL is returned (notified) to the IPP client port 203 in step (1204).

In this way, print data that is requested to be printed is held in holding means (storage means), reference information for performing pull print corresponding to the held printed data is generated and the generated reference information for performing the above-described pull print corresponding to the above-described print data is issued as a print request to a printing apparatus that is made communicatable via a predetermined communication medium. As a result, it becomes possible to easily utilize an IPP printer under a conventional network environment such as an office. Moreover, it becomes possible to utilize an IPP printer without involving work for taking trouble to register print data on a server once and obtain a URL.

Then, receipt of writing print data is started in step (1205) and a file is generated as a file of print data in step (1206).

Processing for receiving writing of print data from the IPP client port 203 and wiring the print data into a print data file is executed in step (1207).

It is checked if the processing is the end of the print data and, if it is not the end of the print data, the processing is shifted to step (1207). On the other hand, if it is the end of the print data, the Web server 204 shifts to step (1209) to perform processing for closing the print data file and ends the processing in step (1210).

Referring to the description of FIG. 8 again, in step (404), information such as a file name of the print data saved in step (403) is registered in the print data management table 206. Next, in step (405), the IPP client port 203 waits for a Pull method from the IPP printer 104 and shifts to step (406) if the Pull method is one for which a request is sent first with respect to certain print data.

If a Pull method request is sent from the IPP printer 104 in step (405), the Web server 204 shifts to step (406) and receives a request of a get method of a Pull method. Referring to a management table as shown in FIG. 5B, if designated print data exists, the Web server 204 returns the print data in step (407). Further, if the Pull method request from the predetermined IPP printer 104 has been recognized on the Web server 204 side, the Web server 204 actually executes processing for determining from which printer the Pull method request was sent and returning the print data via a predetermined communication line according to an IP address or the like of a printer that is specified as a result of the determination. Further, since the detailed description is realized according to processing according to a TCP/IP protocol or the like that is already regarded as publicly known, it is omitted.

Figure 13:
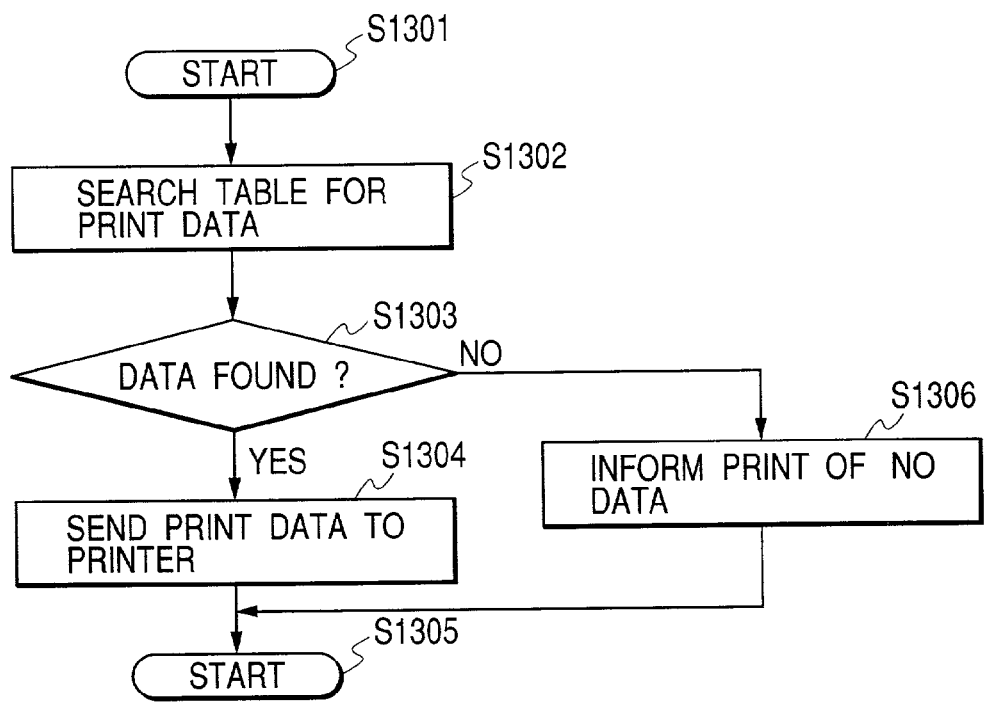
FIG. 13 is a flow chart showing an example of a detailed data processing procedure by the Web server 204 corresponding to step (407) of FIG. 8.

Here, details of step (407) will be described. FIG. 13 is a flow chart showing an example of a data processing procedure in the information processing apparatus in accordance with the present invention, which corresponds to step (407) of FIG. 8 of the processing procedure that should be executed by the Web server 204 shown in FIG. 5A. Further, reference numerals (1301) to (1305) denote respective steps.

First, when a Pull request (a request for obtaining print data corresponding to reference information) is sent from an IPP printer in step (1301), the Web server 204 recognizes an IP address or the like of the IPP printer and, at the same time, retrieves print data corresponding to a URL, which is requested by Pull-Print by the print data management table 206, in step (1302).

Next, the Web server 204 determines if the print data exists in the print data management table 206 in step (1303). If the print data corresponding to the URL exists, the Web server 204 shifts the processing to step (1304) to send the retrieved print data to a printer that issued the Pull request and shifts to step (1305) to end the processing.

On the other hand, if the print data does not exist in the print data management table 206 in step (1303), the Web server 204 notifies the IPP printer that issued the Pull request that a required file (print data) does not exist and shifts to step (1305) to end the processing.

Returning to the description of FIG. 8, the Web server 204 determines in step (408) if the transfer of the print data has been completed and, if it is determined that the transfer of the print data has been completed, shifts the processing to step (409) and deletes the print data from the storage device 205. Then, if print data that the Web server 204 manages does not remain in step (410), the Web server 204 ends the processing in step (411).

Further, as a further preferred embodiment, processing is executed such that, when it is attempted to delete print data in step (409), whether or not the print data is to be deleted is displayed as a message in a selectable form and, if a signal instructing to delete the print data is recognized according to answer information (information indicating whether the print data is deleted or not) according to the message, the print data is deleted, or if a signal instructing not to delete the print signal is recognized, the print data is associated with generated reference information (e.g., URL) and saved.

In addition, if the generated reference information is notified on this occasion, a user can execute print processing of the print data that is saved again by designating the reference information. It is anticipated that this notice is processing closed in the information processing apparatus or a notice to be executed via a network. In particular, in a form such as that in the above-described FIG. 6, if the just described processing is executed by the Web server 606, a mechanism for more efficiently executing printing and obtaining reference information can be realized in a printing system utilizing an IPP printer. In addition, a control is also anticipated which includes information for designating in advance whether or not print data written after print processing ends is deleted in print instruction information (corresponding to a print request of step (301) of FIG. 7) when printing of a job is instructed.

On the other hand, if it is determined in step (408) that return of print data is failed, the Web server 204 returns to step (405) and waits for a request for a Pull method is sent from the IPP printer 104 again.

Then, although the Web server 204 returns an error to a second or later Pull method with respect to the same predetermined print data in step (405), if a first Pull method is sent with respect to predetermined print data after the return of the print data is failed in step (408) in this way, the Web server 204 shifts to step (406) and returns the print data. In addition, it is anticipated that processing for retransferring print data corresponding to reference information is performed again if a second Pull method (print request) is sent when a predetermined time has passed after transfer of a first print data is failed with respect to the same print data.

In addition, it is anticipated that a print request sent via a predetermined communication medium (network 607) is received in the Web server 606 and stored in storage means once, the Web server 606 further generates reference information for performing pull print corresponding to the held print data and the print request is executed on an IPP printer (e.g., 605) together with the reference information to establish a printing system by providing the flow chart of FIG. 8 in the system described in FIG. 6.

Figure 9:
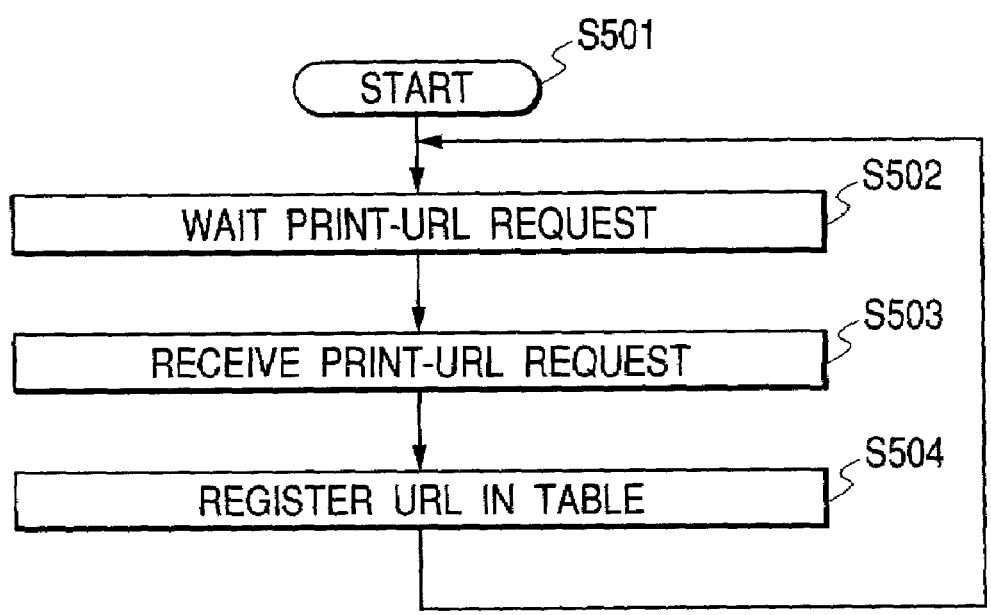
FIG. 9 is a flow chart showing an example of a data processing procedure in a print control apparatus in accordance with the present invention.

FIG. 9 is a flow chart showing an example of a data processing procedure in the print control apparatus in accordance with the present invention, which corresponds to a general processing procedure concerning processing for receiving the Print-URI request 207 of the IPP printer 104. Further, reference numerals (501) to (504) denote respective steps. In addition, it is assumed that actual processing of each step is realized in response to a CPU provided in a printing apparatus reading a program code for executing the flow chart of FIG. 9 stored in nonvolatile storage means such as an ROM, an HD or the like and executing processing according to the read program code.

First, a Print-URI receipt processing unit (not shown) is started in step (501) when a printer main body is started and waits for receipt of the Print-URI request 207 from the IPP client port 203 of a client in step (502).

Then, when the Print-URI request 207 is issued from the IPP client port 203 of a certain client in step (503), the Print-URI receipt processing unit receives the Print-URI request 207 and registers a URL of print data, for which a Print-URI request is designated in the job management table 105 secured, on an RAM of a printer unit in step (504) and, then, returns to step (502) such that the Print-URI is received.

Figure 10:
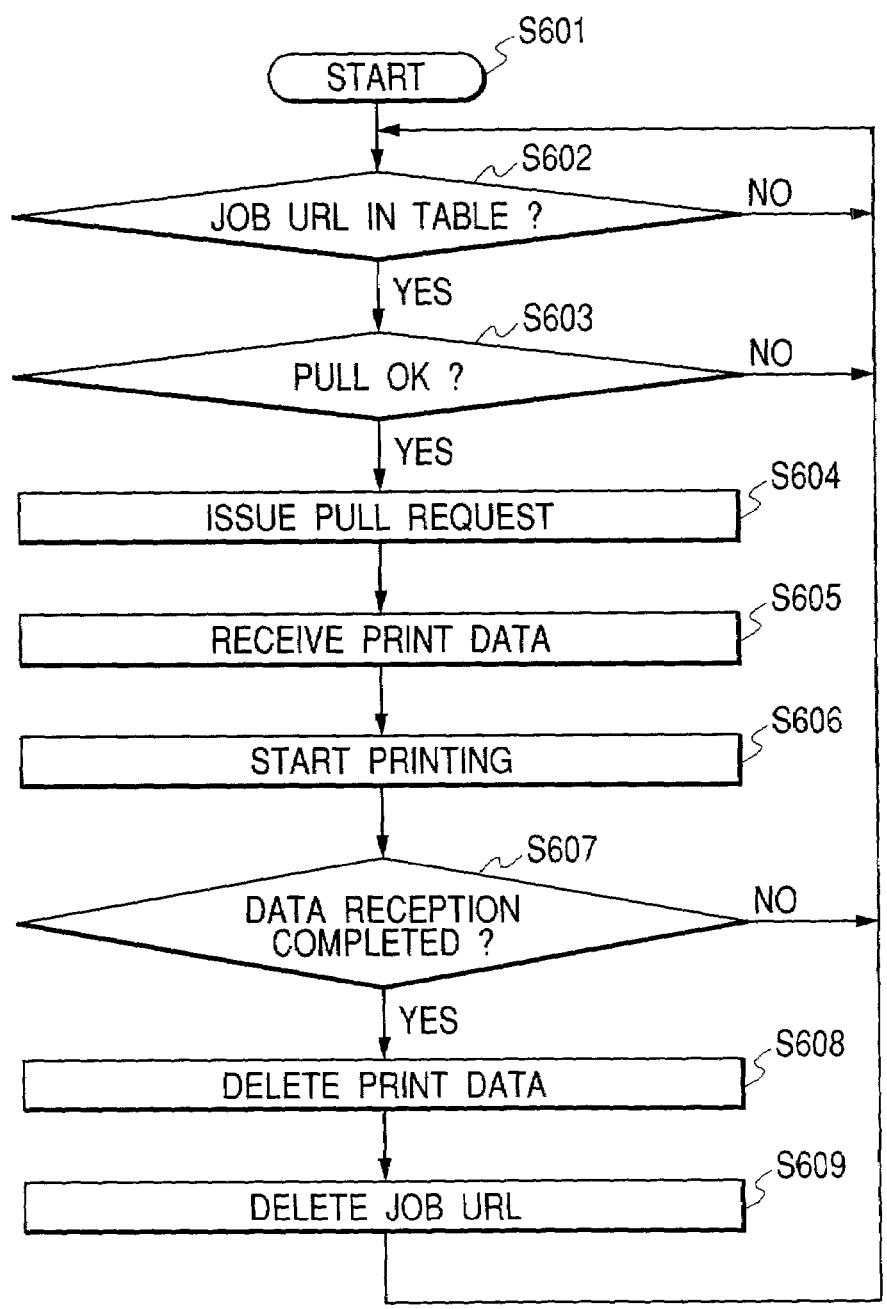
FIG. 10 is a flow chart showing an example of a data processing procedure in a print control apparatus in accordance with the present invention.

FIG. 10 is a flow chart showing an example of a data processing procedure in the print control apparatus in accordance with the present invention, which corresponds to a print processing procedure (also referred to as pull print) relating to the Pull method 208 of the IPP printer 104. Further, reference numerals (601) to (609) denote respective steps. In addition, it is assumed that actual processing of each step is realized in response to a CPU provided in a printing apparatus reading a program code for executing the flow chart of FIG. 10 stored in nonvolatile storage means such as an ROM, an HD or the like and executing processing according to the read program code.

First, a not-shown print processing unit (printer controller) is started in step (601) when a printer main body is started and checks in step (602) if a URL of a job is registered in a job management table secured on an RAM of a printer unit and, if it is determined that the URL of the job is registered, shifts to step (603). Then, the print processing unit checks if an area for receiving print data exists in a storage device (e.g., RAM) of the printer and, if it is determined that there is a space for receiving even a part of the print data, shifts to step (604).

On the other hand, if it is determined in step (603) that an area for receiving the print data does not exist, the print processing unit shifts to step (602). Then, the print processing unit obtains a URL of a print object job from the job management table 105 in step (604) and issues a request for obtaining print data by a Pull method (get method) to the Web server 204 in the URL-designated destination.

Next, if the pertinent print data exists in the Web server 204, since the Web server 204 returns the print data, the print processing unit receives the print data to be returned in step (605) and saves it in the storage device of a printer (e.g., an RAM not shown in FIG. 4).

Next, in step (606), the print processing unit starts print processing of the print data saved in the storage device of the printer in step (605) and, in step (607), determines if receipt of the print data started in step (606) has normally ended and, if it is determined that the receipt has normally ended, shifts to processing of step (608), or if it is determined that the receipt has been failed, returns to the processing of step (602).

Then, the print processing unit deletes the received print data from the storage device in step (608), deletes the URL of the job from the job management table 105 in step (609) and, when the deletion processing ends, returns to step (602) to perform subsequent processing.

In this way, the flow chart described in FIG. 10 is realized, whereby pull print corresponding to the above-described processing of FIG. 7 is realized. In addition, as usual print processing corresponding to this pull print, there is a push print that generates print data in an information processing apparatus via a printer driver and causes a printing apparatus or a printer server to execute print processing.

According to the above-described embodiment, it becomes possible to establish an efficient printing system having a print job scheduling function inexpensively without starting a special purpose print server having a large scale memory or giving a server function to a printer having a large scale memory.

Further, it is within the scope of the present invention to establish a printing system by combining an information processing apparatus and a print control apparatus. It is also within the scope of the present invention to configure a printer, which is capable of selecting a plurality of protocols, to select an optimal protocol in deciding a communication protocol with a host and switchably control print data processing according to this embodiment and print data processing of an ordinary TCP/IP or the like.

In addition, since each block diagram and flow chart that have been described above are realized, specifying information for specifying a place of print data for reference print is determined and prepared together with a print request. Thus, it becomes possible for a user to cause a printing apparatus having a pull print function to perform printing by a print instruction for inputting ordinary print data.

Second Embodiment

First, it is assumed that processing similar to the flow chart of FIG. 7 described in the first embodiment is also realized in a second embodiment if a print instruction is issued. The second embodiment is different from the first embodiment in that a "Print-URI request" designating a URL of print data registered in the Web server 204 in step (304) is issued to a plurality of IPP printers set in advance in the processing of step (305) in the processing of the flow chart of FIG. 7 in the second embodiment. Further, it is anticipated that the plurality of IPP printers set in advance may be set each time a print request is issued or may be registered in advance.

In this way, the processing of the flow chart of FIG. 7 in the second embodiment is realized, whereby reference information for performing the above-described pull print corresponding to the above-described generated print data is issued to a plurality of printing apparatuses as a print request to allow the plurality of printing apparatuses to execute the pull print and it is realized to cause the plurality of printing apparatuses to execute distributed printing or multi-address printing according to an IPP printer. Further, if the distributed printing is performed, setting means is provided which sets a page range or a designated number of prints that are allocated in association with the plurality of printing apparatuses, respectively, and the distributed printing according to a distribution situation set by the setting means is realized.

Figure 14:
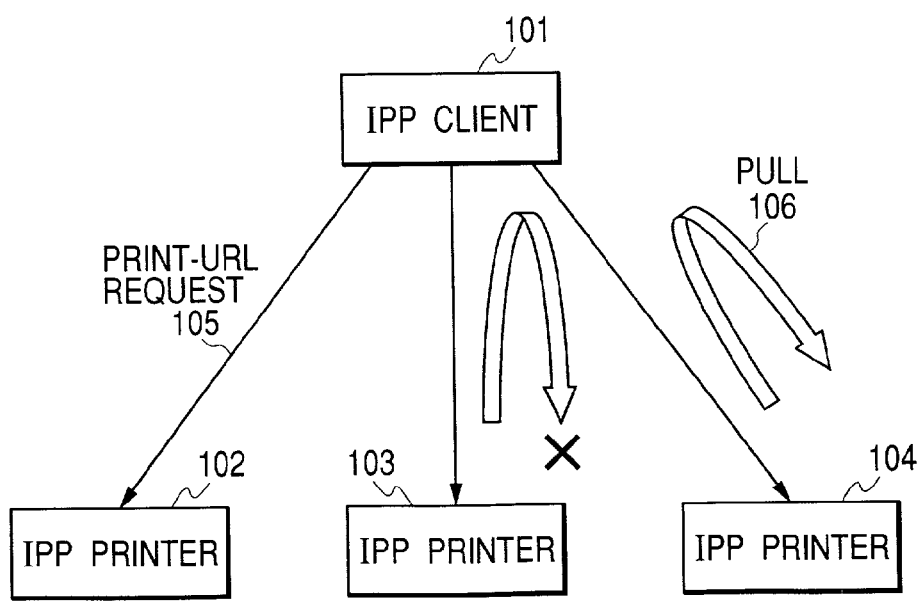
FIG. 14 is a block diagram illustrating a configuration of a print processing system, to which a data processing apparatus and a printing apparatus are applicable, showing an embodiment of the present invention.

Next, FIG. 14 will be described. FIG. 14 is a block diagram illustrating a configuration of a print processing system, to which a data processing apparatus and a printing apparatus are applicable, showing an embodiment of the present invention, which corresponds to a print processing system in which the IPP client (print client) 101 receives print requests from various clients and issues a "Print-URI request" designating a URL of a job to be printed to a plurality of IPP printers 102 to 104, among which a printer that can process the "Print-URI request" first is capable of obtaining and printing print data with a Pull method. The second embodiment is different from the first embodiment in that a predetermined IPP client can send a print request to a plurality of IPP printers.

In FIG. 14, reference numeral 101 denotes an IPP client (print client), 102, 103 and 104 denote an IPP printer, 105 denotes a Print-URI request that the IPP client issues at the time of printing and 106 denotes a Pull method for obtaining print data from a URL-designated destination designated by a "Print-URI request" when the IPP printer becomes available for receiving print data. In addition, since it is assumed that block diagrams of the IPP client and the IPP printer are the same as those described in the first embodiment, detailed descriptions are omitted for them here. In addition, since it is assumed that FIGS. 5A, 5B and 6 described in the first embodiment are applied to the second embodiment, their detailed descriptions are omitted.

As described in the first embodiment, as the Pull method 106, a protocol that is capable of obtaining data on the Internet such as a get method of an Http protocol or a get command of an ftp protocol can be used.

In a printing system configured as described above, when a Print-URI request designating a URL of print data registered in an information processing apparatus functioning as a client (the information processing apparatus of FIG. 4 or the information processing apparatus of the Web server 606 of FIG. 6 described in the first embodiment) functioning as a client is issued to all printers on a network, the print data is returned only to a printing apparatus that has issued a Pull method request first to the registered print data and an error is returned to the other printing apparatuses in response to subsequent Pull methods issued by the other printing apparatuses.

Figure 15:
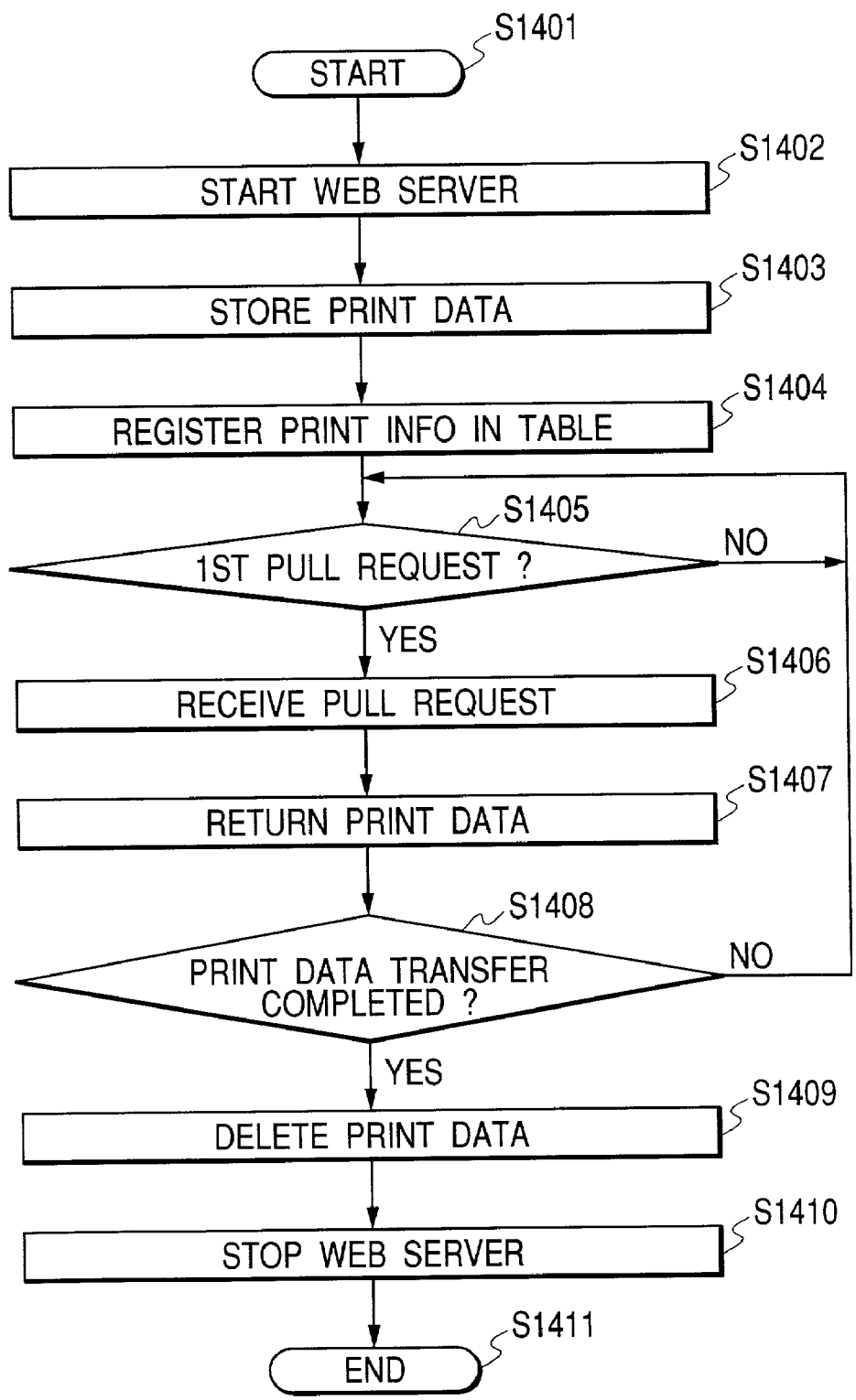
FIG. 15 is a flow chart showing an example of a data processing procedure by a Web server in accordance with the present invention.

FIG. 15 is a flow chart showing an example of a second data processing procedure in the information processing apparatus in accordance with the present invention, which corresponds to a processing procedure that the Web server 204 shown in FIGS. 5A and 5B should execute. Further, reference numerals (1401) to (1411) denote respective steps.

First, since it is assumed that processing of steps (1401) to (1404) is the same as the processing of steps (401) to (404) described in FIG. 8, its detailed description is omitted here. That is, it is assumed that the job management table described in FIG. 5B is applied to the second embodiment.

Next, the Web server 204 waits for a Pull method from the IPP printer 104 in step (1405) and, if a received Pull method is a Pull method that is sent for certain print data first, shifts to step (1406).

In this way, although Pull method requests are sent from the plurality of IPP printers 102 and 103 in step (1405) and subsequent steps, the Web server 204 returns information to the effect that the request is an error via a predetermined communication line in response to a second and subsequent Pull methods instead of returning print data.

Next, if a Pull method request is sent from the IPP printer 104 in step (1405), the Web server 204 shifts to step (1406), receives a request for a Pull method (get method) and, if print data consistent with designated reference information (URL or the like) exists, returns the print data via a predetermined communication line in step (1407). Further, since it is assumed that detailed processing of step (1407) in FIG. 15 is also the same as that described in FIG. 13, its detailed description is omitted.

Then, the Web server 204 determines in step (1408) if the transfer of the print data is completed and, if it is determined that the transfer of the print data is completed, shifts to step (1409) to delete the print data from the storage device 205, stops in step (1410) if print data that it manages does not remain and ends the processing in step (1411).

On the other hand, if it is determined in step (1408) that the return of the print data is failed, the Web server 204 returns to step (1405) and waits for a request for a Pull method is sent from the IPP printer 104 again.

Then, in step (1405), the Web server 204 usually returns an error to second and subsequent Pull methods as described before. However, if the return of the print data is failed in step (1408) in this way, the Web server 204 shifts to step (1406) to return the print data when a Pull method is received first after that.

Here, since it is assumed that a general processing procedure concerning processing for receiving the Print-URI request 207 of the IPP printers 102 to 104, which corresponds to the processing of the flow chart of FIG. 15, is the same as the processing described in FIG. 9 of the first embodiment, its description is omitted here.

As described above, the transmission control (step (1405), (1406) and (1407)) for transmitting print data to a printing apparatus, to which a request for print data is issued first, is realized in response to a print request being issued to a plurality of printing apparatuses. As a result, a control for not transmitting the print data to the printing apparatuses other than the print apparatus, to which the print data is issued first, is realized.

Figure 16:
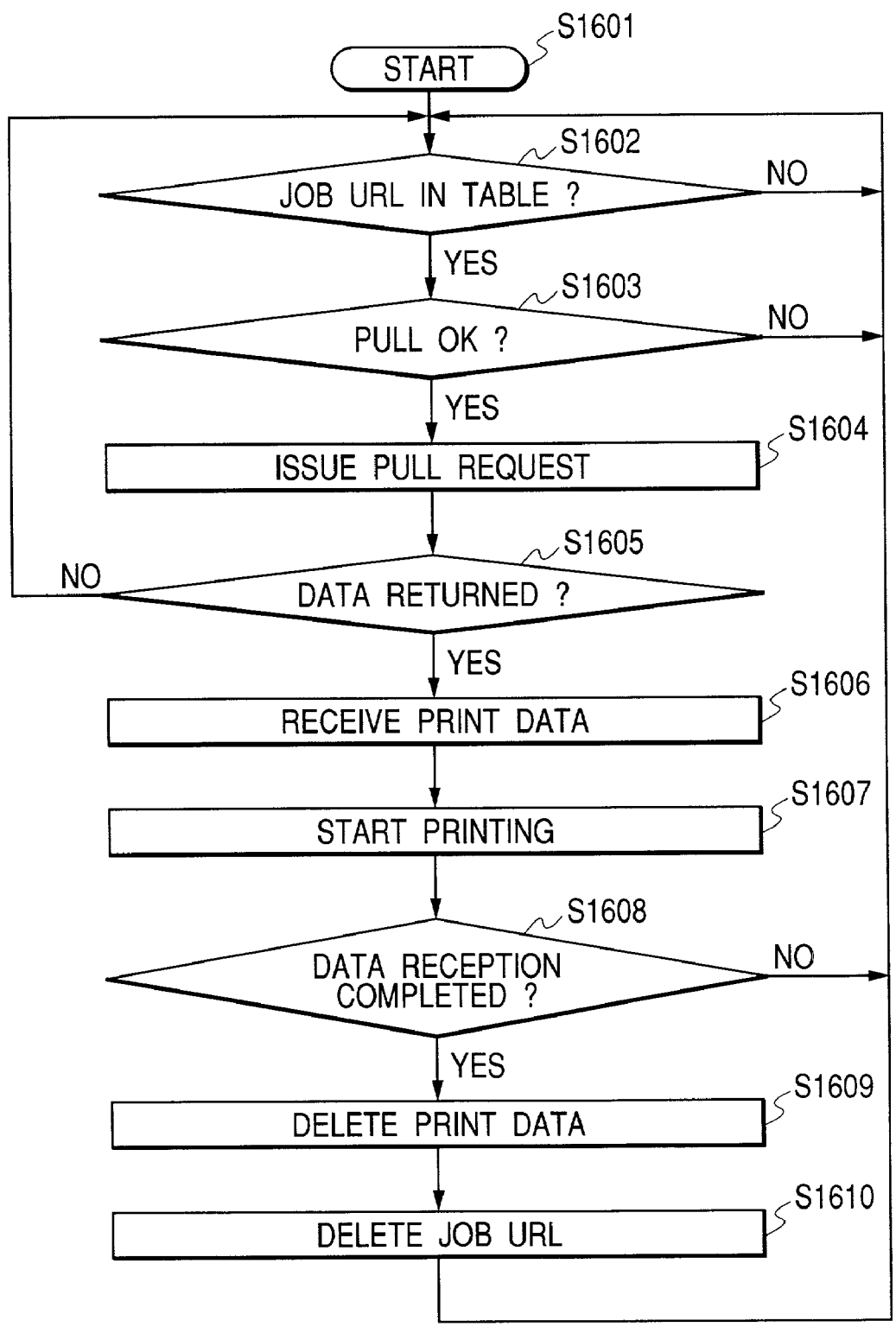
FIG. 16 is a flow chart showing an example of a data processing procedure in a print control apparatus in accordance with the present invention.

Next, FIG. 16 will be described. FIG. 16 is a flow chart showing an example of a data processing procedure in the printing apparatus in accordance with the present invention, which corresponds to a print processing procedure relating to the Pull method 209 of the IPP printer 104. Further, reference numerals (1601) to (1610) denote respective steps.

First, a not-shown print processing unit (printer controller) is started in step (1601) when a printer main body is started and checks in step (1602) if a URL of a job is registered in a job management table secured on an RAM of a printer unit and, if it is determined that the URL of the job is registered, shifts to step (1603). Then, the print processing unit checks if an area for receiving print data exists in a storage device (e.g., RAM) of the printer and, if it is determined that there is a space for receiving even a part of the print data, shifts to step (1604).

On the other hand, if it is determined in step (1603) that an area for receiving the print data does not exist, the print processing unit shifts to step (1602). Then, in step (1604), the print processing unit issues a request for obtaining print data by a Pull method (get method) to the Web server 204 in the URL-designated destination.

Next, in step (1605), if the pertinent print data exists in the Web server 204, since the Web server 204 returns the print data, the print processing unit determines if the print data is returned and, if it is determined that there is no data return, returns to step (1602).

On the other hand, if it is determined in step (1605) that the Web server 204 has returned an error, the print processing unit performs processing of step (1606) and subsequent steps.

Then, the print processing unit receives the print data from the Web server 204 in step (1606) and saves it in the storage device (e.g., a not-shown RAM) of the printer.

Next, in step (1607), the print processing unit starts print processing of the print data saved in the storage device of the printer in step (1606) and, in step (1608), determines if receipt of the print data started in step (1606) has normally ended and, if it is determined that the receipt has normally ended, shifts to processing of step (1609), or if it is determined that the receipt has been failed, returns to the processing of step (1602).

Then, the print processing unit deletes the received print data from the storage device in step (1609), deletes the URL of the job from the job management table 105 in step (1610) and, when the deletion processing ends, returns to step (1602) to perform subsequent processing.

According to the above-described embodiment, it becomes possible to correctly select a printer that starts print processing as soon as possible without selecting a printer based on uncertain determination criteria such as how many print jobs of how large size are scheduled in a printer when selecting such a printer.

Further, it is within the scope of the present invention to establish a printing system by combining ran information processing apparatus and a print control apparatus. It is also within the scope of the present invention to configure a printer, which is capable of selecting a plurality of protocols, to select an optimal protocol in deciding a communication protocol with a host and switchably control print data processing according to this embodiment and print data processing of an ordinary TCP/IP or the like.

In addition, as a further example of application, a control is also anticipated which inquires and recognizes whether or not a printing apparatus (printer) that is made communicatable via a predetermined communication line corresponds to pull print (IPP printer) before step (302) in the processing described in FIG. 7, executes a print request according to the processing of the flow chart shown in FIG. 7 if it is determined (recognized) as an IPP printer or otherwise executes normal print processing (print request corresponding to push print) for directly inputting print data from the information processing apparatus into the printing apparatus. Establishment of more flexible printing system is realized by executing the processing.

A configuration of a data processing program readable by a printing system to which the print control apparatus in accordance with the present invention is applicable will be hereinafter described with reference to memory maps shown in FIGS. 17 and 18.

Figure 17:
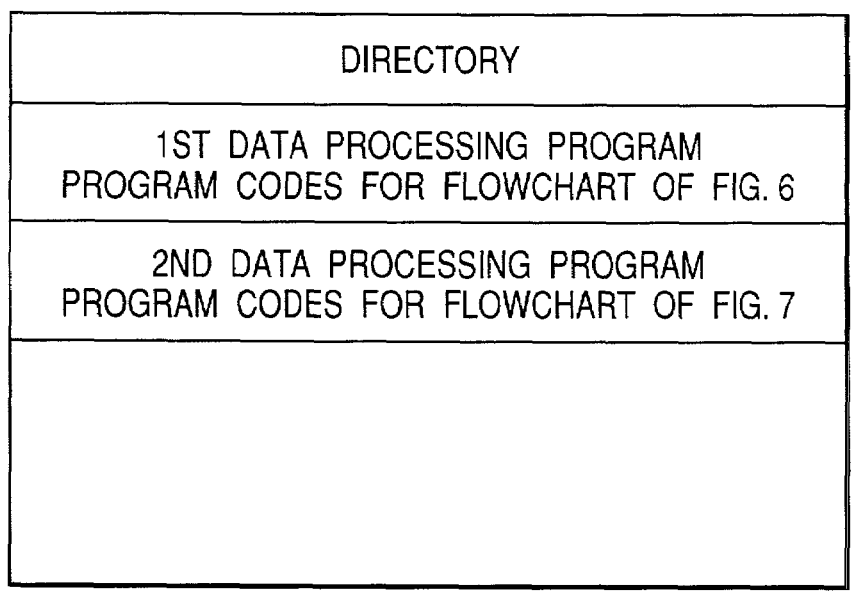
FIG. 17 illustrates a memory map of a storage medium for storing various data processing programs that are readable by a printing system to which an information processing apparatus in accordance with the present invention is applicable.
Figure 18:
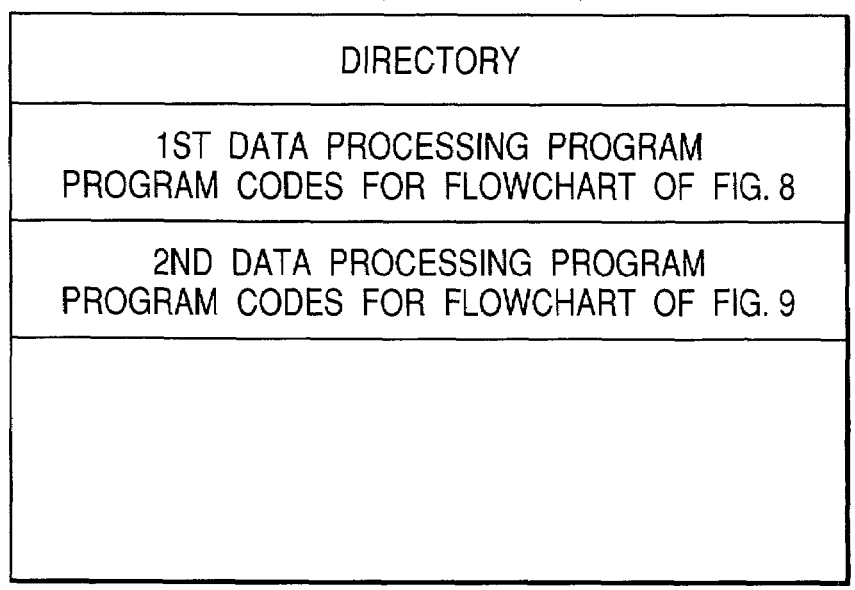
FIG. 18 illustrates a memory map of a storage medium for storing various data processing programs that are readable

FIG. 17 illustrates a memory map of a storage medium for storing various data processing programs readable by a printing system to which the information processing apparatus in accordance with the present invention is applicable. FIG. 18 illustrates a memory map of a storage medium for storing various data processing program readable by a printing system to which the print control apparatus in accordance with the present invention is applicable.

Further, although not specifically shown in the figures, information for managing a program group to be stored in a storage medium, for example, version information and a producer may be stored and information depending on an OS or the like on the program reading side, for example, an icon for identifying and displaying a program may be stored.

Moreover, data subordinate to various programs is also managed in the above-described directory. In addition, a program for installing various programs in a computer and, if the program for installing various programs are compressed, a program for decompressing the program, and the like may be stored.

The functions shown in each flow chart in the first and the second embodiments may be carried out by a host computer according to a program that is installed from the outside. In this case, the present invention is applied even to the case in which an information group including a program is supplied to an output apparatus by a storage medium such as a CD-ROM, a flash memory and an FD or from an external storage medium via a network.

It is needless to mention that a storage medium recording a program code of software for realizing the functions of the above-described embodiments is supplied to a system or an apparatus as described above and a computer (or a CPU or an MPU) of the system or the apparatus reads and executes the program code stored in the storage medium, whereby the objects of the present invention are attained.

In this case, the program code itself read out from the storage medium realizes a new function of the present invention. Thus, the storage medium storing the program code constitutes the present invention.

As a storage medium for supplying a program code, for example, a floppy disk, a hard disk, an optical disk, a magneto-optical disk, a CD-ROM, a CD-R, a magnetic tape, a nonvolatile memory card, an ROM and an EEPROM can be used.

In addition, it is needless to mention that the present invention includes the case in which not only a computer executes a read out program code, but also an OS (operating system) or the like operating on the computer carries out a part or all of actual processing according to an instruction of the program code and the functions of the above-described embodiments are realized by the processing.

Moreover, it is needless to mention that the present invention includes the case in which a program code read out from a storage medium is written in a memory provided in a function extended board inserted in a computer or a function extended unit connected to the computer and, then, a CPU or the like provided in the function extended board or the function extended unit carries out a part or all of actual processing according to an instruction from the program code and the functions of the above-described embodiments are realized by the processing.

As described above, according to the present invention, even if an IPP printer exists in the conventional network printing environment, it becomes possible to sufficiently utilize a function of the printer under a local network environment such as an office, which makes the printer convenience for use.

In addition, an IPP printer can be utilized in such a case in which reference information for specifying a storing place of print data such as a URL is not obtained or reference information corresponding to desired print data is unknown.

Thus, according to the present invention, an effect that convenience of use of an IPP printer is remarkably improved is realized.

What is claimed is:

1. An information processing apparatus comprising:
a holding unit adapted to hold print data;
an issuing unit adapted to issue reference information corresponding to the print data held by said holding unit, to a plurality of printing apparatuses including at least a first printing apparatus and a second printing apparatus;
a first receiving unit adapted to receive an acquisition request of the print data transmitted from the first printing apparatus on the basis of the reference information;
a first transmission unit adapted to transmit the print data to the first printing apparatus in response to the acquisition request received by said first receiving unit;
a judgment unit adapted to judge whether or not the transmission of the print data by said first transmission unit succeeded;
a second receiving unit adapted to receive an acquisition request of the print data transmitted from the second printing apparatus on the basis of the reference information; and
a second transmission unit adapted to not transmit the data to the second printing apparatus in response to the acquisition request transmitted from the second printing apparatus in a case where it is judged by said judgment unit that the transmission of the print data succeeded, and adapted to transmit the data to the second printing apparatus among the plurality of printing apparatuses in response to the acquisition request transmitted from the second printing apparatus in a case where it is not judged by said judgment unit that the transmission of the print data succeeded.

2. The information processing apparatus according to claim 1, wherein said issuing unit is a Web server function processing means.

3. The information processing apparatus according to claim 2, wherein said predetermined protocol is an Internet printing protocol.

4. The information processing apparatus according to claim 2, wherein a print request in compliance with said predetermined protocol is a Pull request for obtaining said print data and the Pull request includes at least a GET method of an HTTP protocol or a get subcommand of an FTP protocol.

5. The information processing apparatus according to claim 2, wherein said Web server function processing unit manages said print data held in said holding unit and starts server function processing for performing Web server function processing in compliance with a predetermined protocol when a print request is issued from an application to a printing system.

6. The information processing apparatus according to claim 5, wherein said printing system includes a printer driver and a print spooler.

7. The information processing apparatus according to claim 1, wherein said print data is transmitted via said predetermined communication medium,
the apparatus further comprising a third receiving unit adapted to receive print data that is transmitted via a predetermined communication medium,
wherein said holding unit holds print data received by said third receiving unit and said issuing unit issues reference information for performing pull print corresponding to the print data held in said holding unit.

8. The information processing apparatus according to claim 1, further comprising a notifying unit adapted to notify a second information processing apparatus, which is made communicatable via a predetermined communication medium, of said reference information.

9. The information processing apparatus according to claim 1, further comprising:
a recognizing unit adapted to recognize whether or not said printing apparatus that is made communicatable via the predetermined communication medium corresponds to pull print; and
a determining unit adapted to determine whether a print request for push print or a print request for pull print is issued to said printing apparatus according to recognition of said recognizing unit.

10. The information processing apparatus according to claim 1, wherein said reference information for performing pull print is information for specifying a storing place of print data stored in a storage unit and includes at least a URL.

11. The information processing apparatus according to claim 1, further comprising a deleting unit adapted to delete said print data held in said holding unit according to a response from the print apparatus to which the print data is transferred.

12. The information processing apparatus according to claim 11, wherein said deleting unit means recognizes information for instructing whether or not said print data held in said holding unit is to be deleted and controls to switch whether or not said print data is to be deleted according to the recognition.

13. The information processing apparatus according to claim 1, wherein said second transmission unit transmits an error to the second printing apparatus in response to the acquisition request transmitted from the second printing apparatus in the case where it is judged by said judgment unit that the transmission of the print data succeeded.

14. An information processing method comprising:
a step of holding print data;
a step of issuing reference information corresponding to the print data held in said holding step, to a plurality of printing apparatuses including at least a first printing apparatus and a second printing apparatus;
a first receiving step of receiving an acquisition request of the print data transmitted from the first printing apparatus on the basis of the reference information;
a first transmitting step of transmitting the print data to the first printing apparatus in response to the acquisition request received in said first receiving step;
a judging step of judging whether or not the transmission of the print data in said first transmission step succeeded;
a second receiving step of receiving an acquisition request of the print data transmitted from the second printing apparatus on the basis of the reference information; and
a second transmission step of not transmitting the data to the second printing apparatus in response to the acquisition request transmitted from the second printing apparatus in a case where it is judged in said judging step that the transmission of the print data succeeded, and transmitting the data to the second printing apparatus among the plurality of printing apparatuses in response to the acquisition request transmitted from the second printing apparatus in a case where it is not judged in said judging step that the transmission of the print data succeeded.

15. The information processing method according to claim 14, wherein said issuing step is a Web server function processing step in compliance with a predetermined protocol.

16. The information processing method according to claim 15, wherein said predetermined protocol is an Internet printing protocol.

17. The information processing method according to claim 15, wherein a print request in compliance with said predetermined protocol is a Pull request for obtaining said print data and the Pull request includes at least a GET method of an HTTP protocol or a get subcommand of an FTP protocol.

18. The information processing method according to claim 14, wherein said reference information for performing pull print is information for specifying a storing place of print data stored in a storage unit and includes at least a URL.

19. The information processing method according to claim 14, further comprising a step of deleting said print data held in said holding step according to a response from said print apparatus to which said print data is transferred.

20. The information processing method according to claim 19, wherein said deleting step recognizes information for instructing whether or not said print data held in said holding step is to be deleted and controls to switch whether or not said print data is to be deleted according to the recognition.

21. The information processing method according to claim 15, wherein said Web server function processing step manages said print data held in said holding step and starts server function processing for performing Web server function processing in compliance with a predetermined protocol when a print request is issued from an application to a printing system.

22. The information processing method according to claim 21, wherein said printing system includes a printer driver and a print spooler.

23. The information processing method according to claim 14, wherein said print data is transmitted via said predetermined communication medium,
the method further comprising a step of receiving print data that is transmitted via a predetermined communication medium,
wherein said holding step holds print data received in said receiving step and said issuing step issues reference information for performing pull print corresponding to the print data held in said holding step.

24. The information processing method according to claim 14, further comprising a step of notifying a second information processing apparatus, which is made communicatable via a predetermined communication medium, of said reference information.

25. The information processing method according to claim 14, further comprising:
   a step of recognizing whether or not said printing apparatus that is made communicatable via the predetermined communication medium corresponds to pull print; and
   a step of determining whether a print request for push print or a print request for pull print is issued to said printing apparatus according to recognition of said recognizing step.

26. The information processing method according to claim 14, wherein said second transmission control step an error to the second printing apparatus in response to the acquisition request transmitted in the second transmission control step in the case where it is judged in said judging step that the transmission of the print data succeeded.

27. A computer readable storage medium storing a program for executing:
   a step of holding print data;
   a step of issuing reference information corresponding to the print data held in said holding step, to a plurality of printing apparatuses including at least a first printing apparatus and a second printing apparatus;
   a first receiving step of receiving an acquisition request of the print data transmitted from the first printing apparatus on the basis of the reference information;
   a first transmitting step of transmitting the print data to the first printing apparatus in response to the acquisition request received in said first receiving step;
   a judging step of judging whether or not the transmission of the print data in said first transmitting step succeeded;
   a second receiving step of receiving an acquisition request of the print data transmitted from the second printing apparatus on the basis of the reference information; and
   a second transmitting step of not transmitting the data to the second printing apparatus in response to the acquisition request transmitted from the second printing apparatus in a case where it is judged in said judging step that the transmission of the print data succeeded, and transmitting the data to the second printing apparatus among the plurality of printing apparatuses in response to the acquisition request transmitted from the second printing apparatus in a case where it is not judged in said judging step that the transmission of the print data succeeded.

28. An information processing apparatus comprising:
   a holding unit adapted to hold print data;
   an issuing unit adapted to issue reference information corresponding to the print data held by said holding unit, to a plurality of printing apparatuses;
   a receiving unit adapted to receive an acquisition request of the print data, transmitted from any of the plurality of printing apparatuses based on the reference information;
   a judging unit adapted to judge whether or not the acquisition request received by said receiving unit is the acquisition request first received in regard to the print data; and
   a transmission control unit adapted to transmit the print data to the printing apparatus which transmitted the acquisition request in a case where it is judged by said judging unit that the received acquisition request is the first-received acquisition request and in a case where transmission of the print data to another printing apparatus failed and it is not judged by said judging unit that the received acquisition request is the first-received acquisition request, and not to transmit the print data to the printing apparatus which transmitted the acquisition request in a case where transmission of the print data to another printing apparatus has been completed and it is not judged by said judging unit that the received acquisition request is the first-received acquisition request.

29. An information processing method comprising:
   a holding step of holding print data;
   an issuing step of issuing reference information corresponding to the print data held in said holding step, to a plurality of printing apparatuses;
   a receiving step of receiving an acquisition request of the print data, transmitted from any of the plurality of printing apparatuses based on the reference information;
   a judging step of judging whether or not the acquisition request received in said receiving step is the acquisition request first received in regard to the print data; and
   a transmission control step of transmitting the print data to the printing apparatus which transmitted the acquisition request in a case where it is judged in said judging step that the received acquisition request is the first-received acquisition request and in a case where transmission of the print data to another printing apparatus failed and it is not judged in said judging step that the received acquisition request is the first-received acquisition request, and not transmitting the print data to the printing apparatus which transmitted the acquisition request in a case where transmission of the print data to another printing apparatus has been completed and it is not judged in said judging step that the received acquisition request is the first-received acquisition request.

30. A computer-readable storage medium which stores a computer-readable program for executing an information processing method comprising:
   a holding step of holding print data;
   an issuing step of issuing reference information corresponding to the print data held in said holding step, to a plurality of printing apparatuses;
   a receiving step of receiving an acquisition request of the print data, transmitted from any of the plurality of printing apparatuses based on the reference information;
   a judging step of judging whether or not the acquisition request received in said receiving step is the acquisition request first received in regard to the print data; and
   a transmission control step of transmitting the print data to the printing apparatus which transmitted the acquisition request in a case where it is judged in said judging step that the received acquisition request is the first-received acquisition request and in a case where transmission of the print data to another printing apparatus failed and it is not judged by said judging unit that the received acquisition request is the first-received acquisition request, and not transmitting the print data to the printing apparatus which transmitted the acquisition request in a case where transmission of the print data to another printing apparatus has been completed and it is not judged in said judging step that the received acquisition request is the first-received acquisition request.

* * * * *

UNITED STATES PATENT AND TRADEMARK OFFICE
CERTIFICATE OF CORRECTION

PATENT NO. : 7,283,266 B2
APPLICATION NO. : 10/023873
DATED : October 16, 2007
INVENTOR(S) : Yagita It is certified that error appears in the above-identified patent and that said Letters Patent is hereby corrected as shown below:

Title Page, Item (57) ABSTRACT:
Line 7, "causing" should read -- cause --.

COLUMN 1:
Line 27, "has" should read -- has been --;
Line 28, "in" should read -- from --;
Line 29, "Printo-URI" should read -- Print -URI --; and
Line 31, "Printo-URL" should read -- Print -URL --.

COLUMN 4:
Line 43, "an" should read -- a --.

COLUMN 14:
Line 52, "ran" should read -- an --.

COLUMN 16:
Line 10, "convenience" should read -- convenient --.

COLUMN 19:
Line 14, "step" should read -- step transmits --; and
Line 19, "computer readable" should read -- computer-readable --.

Signed and Sealed this

Tenth Day of June, 2008

JON W. DUDAS
*Director of the United States Patent and Trademark Office*